United States Patent

Klose

[11] 4,093,340
[45] June 6, 1978

[54] LIGHT-BEAM DEFLECTION SYSTEM
[75] Inventor: Karl Klose, Hamburg, Germany
[73] Assignee: U.S. Philips Corporation, New York, N.Y.
[21] Appl. No.: 688,064
[22] Filed: May 19, 1976
[30] Foreign Application Priority Data
May 30, 1975 Germany ............................ 2524152
[51] Int. Cl.² .......................................... G02B 27/17
[52] U.S. Cl. .................................... 350/6.5; 358/214
[58] Field of Search ........................................ 350/6-7, 350/199, 287, 292, 285; 178/6.7, 7.6; 179/100.3 V; 250/236; 356/167; 358/214, 289, 199

[56] References Cited
U.S. PATENT DOCUMENTS

| | | | |
|---|---|---|---|
| 1,948,184 | 2/1934 | Abbot | 350/99 |
| 2,707,903 | 5/1955 | Trombe | 350/292 |
| 3,485,546 | 12/1969 | Roth | 350/7 |
| 3,645,606 | 2/1972 | La Vantine | 350/292 |
| 3,972,583 | 8/1976 | Loff | 178/7.6 |

Primary Examiner—John K. Corbin
Assistant Examiner—B. W. de los Reyes
Attorney, Agent, or Firm—Frank R. Trifari; Simon L. Cohen

[57] ABSTRACT

A light-beam deflection system for scanning documents of large format, in which a switchable very narrow light-beam is passed over a series of stationary plane mirrors whose centers are arranged on a parabola and whose inclination with respect to the document onto which the reflected light-beam is directed is that of the tangent to the parabola at the point of contact with corresponding mirror center.

6 Claims, 2 Drawing Figures

LIGHT-BEAM DEFLECTION SYSTEM

The invention relates to a light-beam deflection system for scanning a record surface of a document or of a photosensitive recording medium along a linear scanning path.

Such apparatus can be employed, for example, both for scanning a document using a scanning illumination spot to provide an input to video, facsimile or pattern recognition apparatus, or correspondingly by using a suitably modulated scanning spot, for recording video, facsimile or measurement signals on a photosensitive recording medium.

However, when scanning documents having a large format, for example DIN A4 by means of a focused light-beam or in the recording of information on photosensitive layers on supporting sheets of the same format, difficulties are encountered when attempting to displace the scanning spot formed by focussing the light-beam, over the distance involved. The use of conventional light-beam deflection units employing mirrors gives rise to special problems. When such a deflection unit is located between a focusing objective and the document, the galvonometer mirror or rotating polygon mirror normally employed, enables the light-beam to be deflected along a scan path of approximately 20 cm in length, but the point-of focus of the scanning spot formed by the light-beam will describe a complex curve in space and the document must be correspondingly curved to follow the focal surface thereby defined. This is impractical, notably in the case of continuous forms, and cannot be performed in the case of rigid document or a recording surface on a rigid supporting base. Moreover, such deflection units as have been hitherto proposed, do not display a linear relationship between the displacement of the scanning spot over the surface to be scanned and the angular displacement employed in the deflection unit. If, however, the deflection unit is arranged in the optical path before the focusing objective, the focal surface can be constrained to lie in a plane when use is made of a high-quality objective, but in this case it is only possible to scan a portion of the surface at a time especially when scanning the larger formats.

The invention has for an object to provide an improved light-beam deflection system in which these drawbacks are reduced and which can enable documents of large format to be readily scanned.

According to the invention there is provided a light-beam deflection system for scanning a surface of a document or a photosensitive recording medium along a linear scanning path, including rotational means for angularly deflecting about an axis of rotation, a very narrow light-beam said light-beam being angularly deflected in a deflection plane which also contains the linear scanning path, so that said light-beam is successively incident on each of a series of stationary plane mirrors each of which is arranged perpendicular to said deflection plane and tangential at its center, to a parabola defined in said deflection plane so that the focal point thereof coincides with the axis of rotation of the light-beam, and the axis of symmetry thereof is perpendicular to said surface to be scanned.

A light-beam deflection system embodying the invention, can advantageously be used for facsimile registration or for an X-Y recorder, because large formats such as DIN A3 can be scanned.

In order that the invention may be clearly understood and readily carried into effect, an embodiment of the invention will now be specifically described by way of example, with reference to the accompanying drawing, of which:

Figures 1, 2:
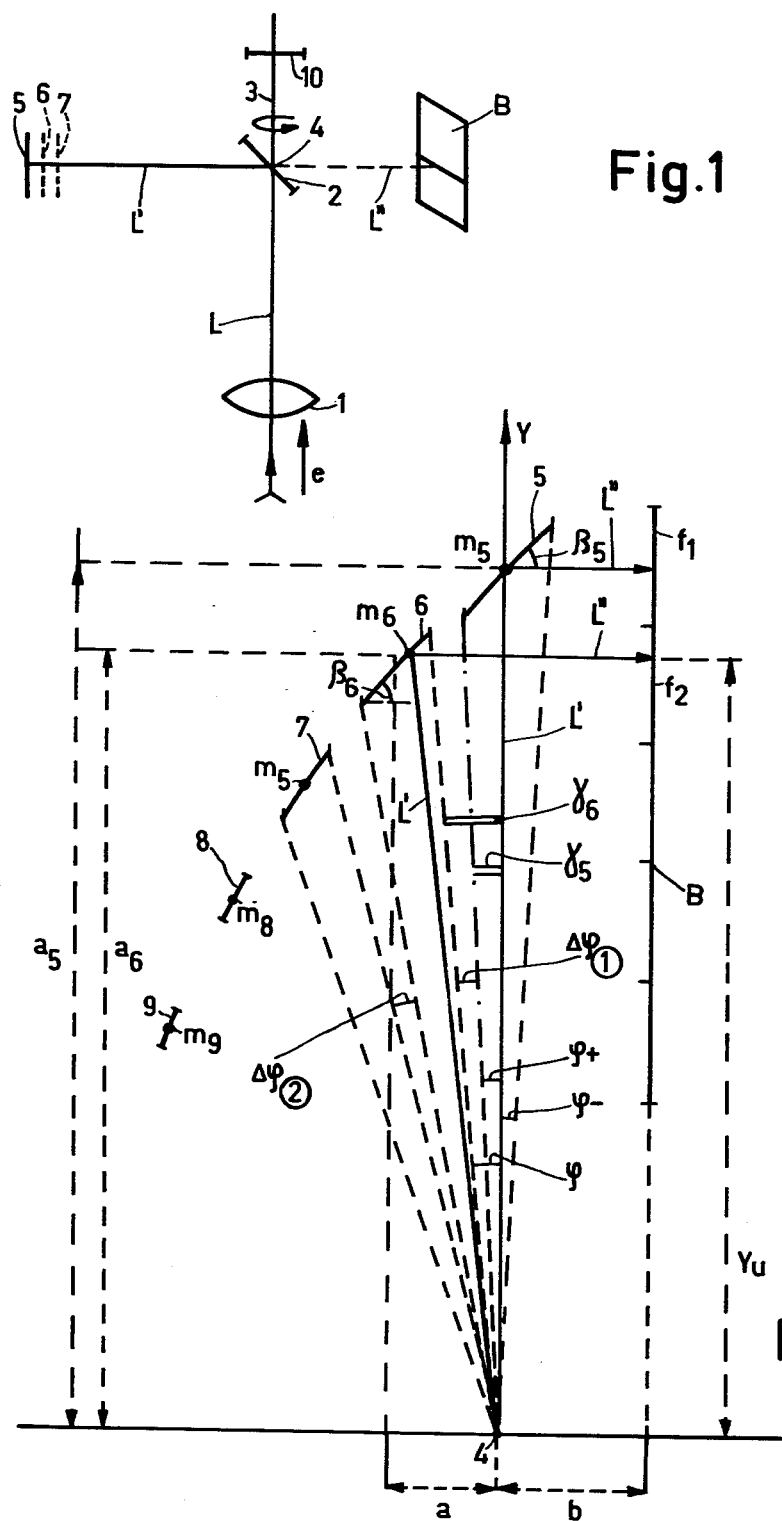
FIG. 1 is a diagrammatic side elevation of an embodiment.
FIG. 2 is a diagrammatic plan view of the embodiment shown in FIG. 1.

Referring to FIG. 2, a very narrow light-beam, preferably formed using a laser is first passed through a focussing objective 1 arranged to focus the light-beam as a scanning spot on a record surface to be scanned. The light-beam L is subsequently directed onto a rotatable deflection member, in this case a mirror 2, which deflects the light-beam through 90° with respect to the direction of incidence. The rotatable mirror 2 is arranged at an angle with respect to the axis of rotation thereof 3, and is adjusted so that the axis of rotation 3 coincides with the axis of the incident light-beam L. Thus, a fixed centers of rotation 4 is obtained for the light-beam L on the mirror 2 when the mirror 2 is rotated about the axis 3 to perform the scanning operation. The reflected light-beam L' is thus angularly displaced about the direction of incidence $e$ in a scanning plane (the plane of the drawing of FIG. 2) which is perpendicular with respect to the initial direction of incidence $e$. The light-beam L is directed in succession onto the respective members of a group of mirrors consisting, in the present example, of five stationary plane mirrors 5 . . . 9. The number of mirrors in the group can however be varied in dependence on the format to be scanned. Each mirror 5 . . . 9 is arranged as indicated in FIG. 1 so that the light-beam L'' is reflected thereby onto a record plane B (the plane of the document or recording medium) which is perpendicular with respect to the scanning plane and scans a corresponding one-fifth of the width of the document or recording medium. The angles of inclination of the plane mirrors 5 . . . 9 with respect to the record plane B must be set as described hereinafter. The plane mirrors must also be located so that the record plane B is always within a defined depth of focus range from the focal surface of the focussed scanning spot formed by the objective lens 1 from the light-beam. The scanning spot must traverse the same linear distance over the record surface within the same period of time, that is to say for the same angular displacement of the mirror 2, at all points along the scan path where the scan is continuous. The focal surface of the scanning spot formed from the light-beam is maintained within a predetermined depth of focus distance from the record plane B by locating the centers $m_5 \ldots m_9$ of the plane mirrors 5 . . . 9 on a parabola, such that the center of rotation 4 of the rotating mirror 2 and of the deflected light-beam L', is located at the focal point of the said parabola (FIG. 2). The equation of the parabolar in the X–Y system of co-ordinates shown in FIG. 2 is:

$$y^2 = 2 a_5 \cdot x + 2 a^2_5.$$

If the light-beam L' were reflected by a reflecting surface which followed the curve of the parabola, the overall distance from the center of rotation 4 to the parabola and then to the record plane B would always be constant, but the speed at which the scanning spot traverses the record plane B would vary considerably with the angular displacement of the rotating mirror 2.

However, by using a number of stationary plane mirrors 5 . . . 9 each of whose inclination $\beta$ is made equal to the inclination of the tangent to the parabola at the center $m_5$. . . $m_9$ of the corresponding mirror, the speed at which the scanning spot traverses the record plane B, is maintained substantially constant, independently of which stationary plane mirror is momentarily reflecting the light-beam. The linear motion of the scanning spot is made more uniform as the number of stationary plane mirrors is increased because each of the individual component angular displacements $\phi$ required to cause the light-beam to scan across a corresponding mirror will be reduced. Furthermore, when the stationary plane mirrors are correctly positioned, the end of one scanned section $f_1$ can be made to correspond with the beginning of the next section $f_2$ which is scanned by reflection of the light-beam by the next mirror, thus enabling a spatially continuous scanning pass to be made over the entire scanning path $B_x$. If the light-beam L″ is arranged to scan a section $f_1$ having a length $d$ during an angular displacement of the rotating mirror 2, which causes the beam to cross the mirror 5 the distances between the centers $m_5$, $m_6$ . . . of the corrresponding mirrors must also be $d$ in the direction of the Y-axis of the parabola. The dependence of the instantaneous Y-co-ordinate of the center of the scanning spot on the record plane B, on the displacement angle $\phi$ of the light-beam L′, is given by the following formula:

$$Y_u = b - \left[\frac{a - c \cdot \tan \beta}{\tan (90° + \phi) - \tan \beta}\right] \cdot \tan (2\beta + 90° - \phi)$$
$$+ \frac{a - c \cdot \tan}{\tan (90° + \phi) - \tan \beta} \cdot \tan (90° + \phi).$$

The displacement angle $\phi$ is measured from the positive y axis of the parabola in a mathematically positive sense. The quantities $a$, $b$, $c$ and $\beta$ can be derived from FIG. 2, the appropriate values $a_5$, $a_6$. . . $a_9$; $c_5$, $c_6$. . . $c_9$; $\beta_5$, $\beta_6$ . . . $\beta_9$ being inserted for $a$, $c$ and $\beta$, depending on the selected mirror. For the mirror 5 furthest from the axis of rotation 4, and whose center $m_5$ is situated on the y-axis, it is assumed, for example, that $a_5 = 30$ cm and $c_5 = 0$, the angle of inclination of the mirror $\beta_5$ being 45°. The distance $b$ between the record surface B and the origin of the system of co-ordinates which coincides with the center of rotation 4, is in the present example 5 cm. When the light-beam L′ is directed at the center $m_5$ of the mirror 5, the angle $\phi = 0$ and the corresponding distance $$Y_t(\phi = 0) = 30 \text{ cm}.$$

The light-beam L″ reflected by the mirror 5 will then extend parallel to the x-axis of the parabola and be directed perpendicularly onto the record surface B. When the light-beam L′ is delfected from this axial direction through an angle $\phi_- = -3.27048°$ or $$\phi_+ = +3.27048°,$$

the following values can be calculated:

$$Y_t(-3.27048°) = 32 \text{ cm}$$

$$Y_t(+3.27048°) = 28 \text{ cm}.$$

An angle of rotation of $\phi_- + \phi_+ = 6.54096°$ can thus cause the scanning spot to traverse a section $f_1$ of length 4 cm over the record surface B. The overall scan resulting from successive reflection of the light-beam L′ in each of the five mirrors 5 . . . 9 will thus extend over a distance of 20 cm in the present example.

The Y-co-ordinate $a_6$ of the center $m_6$ of the next adjacent mirror 6 must be 4 cm less than that of the center $m_5$ of the first reflection mirror 5, namely 26 cm. The associated c-value is obtained using the system of co-ordinates introduced in FIG. 2, from the inverse function of the corresponding parabola:

$$Y = \sqrt{a_5^2 + 2a_5 \cdot c_6} \text{ where } a_5 = 30 \text{ cm}$$

$$26^2 = \sqrt{30^2 + 2.30 \cdot c_f}$$

$$c_6 = -3.7333 \text{ cm}.$$

The angle of inclination $\beta_6$ of the mirror 6 is obtained from the slope of this function at the point $(-3.7333; 26)$ as $$(a_5/Y) = (30/26) = 1.15384$$

$$\beta_6 = 49.08562°.$$

The angular displacement $\phi$ of the center $m_6$ from the Y-axis about the origin 4, is obtained from $\tan \phi = (c_6/a_6)$. It follows that: $\phi = 8.17122°$. The limiting angles and the terminal Y-co-ordinates of the scanned section $f_2$ for reflection in the second mirror 6, are derived therefrom as follows:

$$Y_t(8.17122° - 3.27048°) = Y_t(4.90074°) = 28 \text{ cm}$$

$$Y_t(8.17122° + 3.27048°) = Y_t(11.44170°) = 24 \text{ cm}.$$

Even though the second scanned section $f_2$ of 4 cm directly adjoins the first section $f_1$, there is an angular gap between the corresponding adjacent limiting angles $Y_5$ and $Y_6$ of the deflected light-beam L′ when incident respectively on the first and the second mirrors 5 and 6, this:

reflection mirror 5 $Y_t(3.27048°) = 28$ cm, and reflection mirror 6 $Y_t(4.90074°) = 28$ cm, which means $\Delta \phi_1 = 1.63026°$.

The laser light-beam generator must be switched off by means of a modulator while the mirror 2 displaces the light-beam L′ through this angle $\Delta \phi$. The starting and finishing points of a scanned sector can be electronically determined and adjusted in known manner, for example by means of a synchronization disk 10 secured to the rotary shaft.

The angular displacement $\Delta \phi$ between adjacent scanning sectors is dependent on the arrangement of the corresponding mirrors between which the light-beam is switched off.

Reflection mirror 6 $Y_t(11.44170°) = 24$ cm ⎫
Reflection mirror 7 $Y_t(14.22184°) = 24$ cm ⎭ $\Delta\phi_2 = 2.78014°$
Reflection mirror 7 $Y_t(20.76280°) = 20$ cm ⎫
Reflection mirror 8 $Y_t(24.80200°) = 20$ cm ⎭ $\Delta\phi_3 = 4.03929°$
Reflection mirror 8 $Y_t(31.34296°) = 16$ cm ⎫
Reflection mirror 9 $Y_t(36.69573°) = 16$ cm ⎭ $\Delta\phi_4 = 5.35277°$ The following calculation illustrates how the record surface B can be made to remain within a predetermined the depth of focus during the scanning operation and also how little the speed of traverse of the scanning spot over the record surface fluctuates when employing the hereinbefore described embodiment of the invention.

It can be seen from the mirror arrangement that the overall distance from the center of rotation 4 to the center $m_5$ of the first reflection mirror 5 ($\phi = 0°$) and then to the record surface B, is 35 cm. However, if the light-beam L' is directed at the mirror $m_5$ from a displacement angle $\phi = +3.27048°$, the corresponding distance amount to 35.05709 cm. Consequently, the point of focus of the scanning spot is situated 571μm in front of the record surface B. The depth of focus $Z_s$ of the scanning spot is calculated from the following:

$$Z_s = \pm \frac{\pi}{4} \sqrt{\left(\frac{d}{d_F}\right)^2 - 1} \cdot \frac{d_F^2}{\lambda}.$$

If the depth of focus is defined by the boundary distance $Z_s$, for which the laser beam diameter $d$ is 10% larger than the focus diameter $d_F$, which means that $d/d_F = 1.1$ it follows that $$Z_s = \pm 0.36 \cdot \frac{d_F^2}{\lambda}$$

If the focussed spot diameter $d_F$ amount to, for example 50μm and the wavelength $\lambda = 0.514$μm, then $Z_s = \pm 1751$μm. Thus, in the above example, the document will be located well within the depth of focus range, and the focussed scanning diameter spot could even be made smaller if desired.

The linearity of the relationship between the displacement angle $\phi$ and y-co-ordinate of the scanning spot can be tested by sub-dividing an angular displacement of $2 = 6.54096°$ into ten equal subdivisions determining the associated boundary $Y_U$-coordinates:

$a_5 = 30$ cm $b = 5$ cm $\beta_5 = 45°$ (mirror 5)

$Y_U(-3.27048°) = 32.00000$ cm $Y_U(-2.616388°) = 31.59936$ cm $Y_U(-1.96228°) = 31.19916$ cm $Y_U(-1.30819°) = 30.79926$ cm $Y_U(-0.65409°) = 30.39958$ cm $Y_U(0°) = 30.00000$ cm $Y_U(0.65409°) = 29.60041$ cm $Y_U(1.30819°) = 29.20073$ cm $Y_U(1.96228°) = 28.80083$ cm $Y_U(2.61638°) = 28.40063$ cm $Y_U(3.27048°) = 28.00000$ cm.

The theoretical values of $Y_U$ would be 28.8 cm at the point where $\phi = +1.96228°$ in the case of linear displacement of the scanning spot. The deviation from this ideal value for an arrangement employing 5 stationary plane mirrors, e.g. 5 . . . 9 in FIG. 2, this amounts to approximately 8.3μm, and hence is small with respect to the focussed spot diameter $d_F = 50$μm.

In order to make each plane mirror intercept to whole of the light-beam at the limiting angles, the mirrors would have to be made slightly wider than the calculated values to take account of the beam diameter at the point of interception.

What is claimed is:

1. A light beam deflection system for scanning a planar surface along a linear scanning path at a uniform rate of speed, comprising light source means for providing a narrow light beam, rotational means for angularly deflecting said light beam about an axis of rotation in a scanning plane containing said scanning path, a series of stationary planar mirrors, each of said planar mirrors being arranged perpendicular to said deflecting path and tangential to a parabola defined in said deflection plane so that the focal point thereof coincides with the axis of rotation of said light beam and the axis of symmetry thereof is perpendicular to the planar surface to be scanned.

2. A light-beam deflection system as claimed in claim 1, in which the distance between the centers of adjacent mirrors when projected perpendicularly onto said surface to be scanned and measured in a direction perpendicularly to the symmetry axis of the parabola, equals 1/nth of the width of the surface to be scanned, where $n$ denotes the number of mirrors.

3. A light-beam deflection system as claimed in claim 1, in which said light-beam is formed by radiation from a laser.

4. A light-beam deflection system as claimed in claim 1, in which said light-beam is directed along said axis of rotation onto said rotational means, and said rotational means comprise a rotatable deflection member arranged to be rotated about said axis of rotation and to deflect said incident light-beam through a right angle.

5. A light-beam deflection system as claimed in claim 4, in which the deflection member is arranged in the light-beam path after a focusing objective which forms a focussed scanning spot from said light-beam and whose focal distance equals the overall distance along the path of said light-beam from said objective to said surface to be scanned via the center of angular displacement of said light-beam and the center of a said stationary plane mirror.

6. A light-beam deflection system as claimed in claim 5, in which the aperture ratio of said objective is chosen so that the surface to be scanned is always situated within the depth of focus range of said scanning spot at the desired working resolution of the system.

* * * * *